(12) United States Patent
Contreras

(10) Patent No.: US 7,476,114 B1
(45) Date of Patent: Jan. 13, 2009

(54) COVER ASSEMBLIES FOR CABLES AND ELECTRICAL CONNECTIONS AND METHODS FOR MAKING AND USING THE SAME

(75) Inventor: Miguel Contreras, Fuquay-Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/114,995

(22) Filed: May 5, 2008

(51) Int. Cl.
*H01R 4/60* (2006.01)

(52) U.S. Cl. ........................ 439/201; 439/796; 439/901

(58) Field of Classification Search ................. 439/199, 439/201, 271, 275, 587, 796–798, 901, 904
See application file for complete search history.

(56) References Cited

U.S. PATENT DOCUMENTS

| | | | | |
|---|---|---|---|---|
| 3,163,707 | A * | 12/1964 | Darling | 174/47 |
| 3,475,719 | A * | 10/1969 | Akin et al. | 439/668 |
| 4,601,529 | A * | 7/1986 | Billet | 439/281 |
| 5,233,363 | A * | 8/1993 | Yarsunas et al. | 343/715 |
| 5,286,220 | A * | 2/1994 | Watson | 439/589 |
| 5,315,063 | A * | 5/1994 | Auclair | 174/78 |
| 5,577,926 | A * | 11/1996 | Cox | 439/204 |
| 6,364,677 | B1 * | 4/2002 | Nysveen et al. | 439/199 |
| 7,182,617 | B1 * | 2/2007 | Cairns et al. | 439/271 |
| 7,264,494 | B2 * | 9/2007 | Kennedy et al. | 439/274 |
| 2007/0293087 | A1 * | 12/2007 | Kennedy et al. | 439/606 |
| 2008/0143097 | A1 * | 6/2008 | Canale | 285/7 |

OTHER PUBLICATIONS

"CSJA In-line Cold Shrinkable Joints for 1/C Shielded Power Cables (15-35kV)" Tyco Electronics, 2006/2007, 2 pages.
"CSJA Cold Shrinkable 'All-In-One' Straight Joint for Polymeric Insulated Cables Up to 42 kV" Tyco Electronics EPP 1348 7/07, 4 pages.

* cited by examiner

*Primary Examiner*—James Harvey
(74) *Attorney, Agent, or Firm*—Myers Bigel Sibley & Sajovec, PA

(57) ABSTRACT

An integral, unitary cover assembly for covering an electrical connection between first and second electrical cables each having a primary conductor and a neutral conductor includes an inner elastomeric sleeve, an outer elastomeric sleeve and a duct member. The inner sleeve defines a cable passage to receive the electrical connection and the primary conductors of the first and second cables. The outer sleeve surrounds the inner sleeve. The duct member is interposed between the inner and outer sleeves. The duct member defines a neutral conductor passage configured to receive at least one of the neutral conductors therethrough.

24 Claims, 7 Drawing Sheets

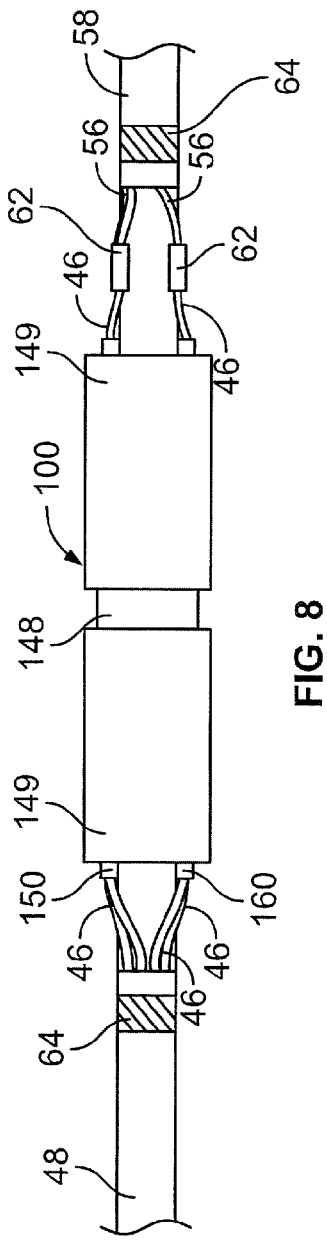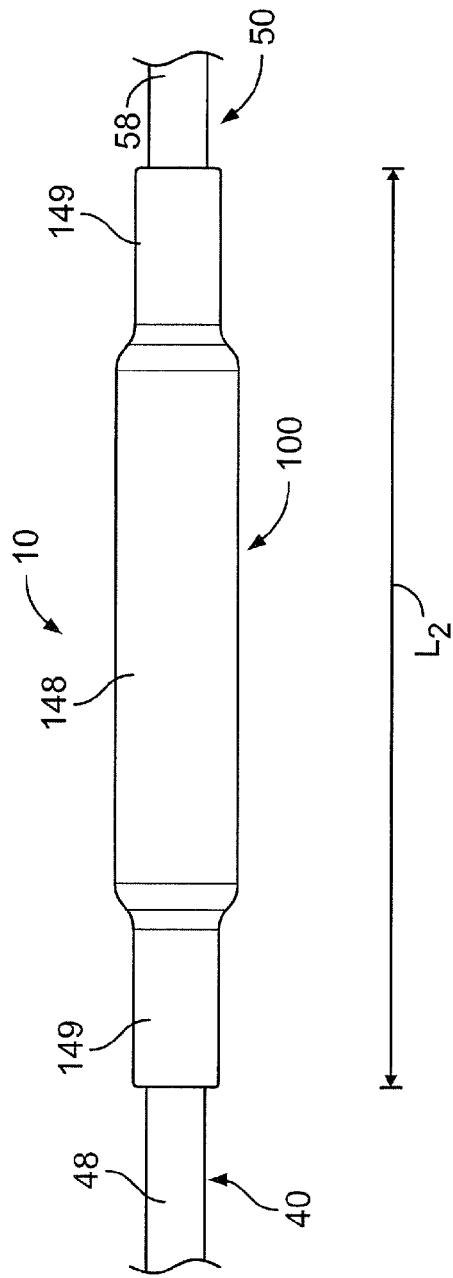

COVER ASSEMBLIES FOR CABLES AND ELECTRICAL CONNECTIONS AND METHODS FOR MAKING AND USING THE SAME

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from Tyco Electronics Corporation of Fuquay-Varina, N.C., which includes an integral neutral conductor mesh. It is also known to cover splices between concentric neutral cables using a cold shrink elastomeric cover tube (such as the CSJ™ product, available from Tyco Electronics Corporation) in combination with a separate re-jacketing cover (such as the GELWRAP™ product, available from Tyco Electronics Corporation). In this case, the cold shrink tube is installed over the primary conductors and the insulation layers, the neutral conductors are laid over the cold shrink tube, and the re-jacketing cover is subsequently wrapped around the neutral conductors and the insulation layer. Each of these known methods may suffer from problems or limitations in performance and/or installation.

SUMMARY OF THE INVENTION

According to embodiments of the present invention, an integral, unitary cover assembly for covering an electrical connection between first and second electrical cables each having a primary conductor and a neutral conductor includes an inner elastomeric sleeve, an outer elastomeric sleeve and a duct member. The inner sleeve defines a cable passage to receive the electrical connection and the primary conductors of the first and second cables. The outer sleeve surrounds the inner sleeve. The duct member is interposed between the inner and outer sleeves. The duct member defines a neutral conductor passage configured to receive at least one of the neutral conductors therethrough.

According to some embodiments, the duct member is rigid or semi-rigid.

In some embodiments, the duct member is tubular.

According to some embodiments, the cover assembly includes a second duct member interposed between the inner and outer sleeves. The second duct member defines a second neutral conductor passage configured to receive at least one of the neutral conductors therethrough.

In some embodiments, the cover assembly extends along a lengthwise axis from a cover first end to a cover second end, and the inner sleeve, the outer sleeve and the duct member each extend lengthwise and have a respective first end proximate the cover first end and a respective second end proximate the cover second end. The outer sleeve may include an extension section that extends lengthwise beyond the first end of the duct member. In some embodiments, the extension section of the outer sleeve extends lengthwise beyond the first end of the inner sleeve.

According to some embodiments, the outer sleeve is formed of ethylene propylene diene monomer (EPDM) rubber. According to some embodiments, the inner sleeve is formed of silicone rubber.

In some embodiments, the cover assembly includes a Faraday cage sleeve mounted within the inner sleeve and formed of an electrically conductive elastomer.

The cover assembly may include a stress cone sleeve mounted within the inner sleeve proximate an end thereof. The stress cone sleeve is formed of an electrically conductive elastomer.

According to some embodiments, the cover assembly includes a semiconductor layer mounted on an outer side of the inner sleeve and formed of an electrically conductive elastomer.

The cover assembly may further include a removable holdout device mounted within the inner sleeve. The holdout device is operative to temporarily maintain the inner sleeve and the outer sleeve in an expanded state.

According to some embodiments, the cover assembly is a cold shrinkable cover assembly.

According to further embodiments of the present invention, a connection assembly includes: first and second electrical cables each including a primary conductor and at least one neutral conductor; a connector coupling the primary conductors of the first and second cables to form an electrical connection; and an integral, unitary cover assembly. The cover assembly includes an inner elastomeric sleeve, an outer elastomeric sleeve and a duct member. The inner sleeve defines a cable passage. The outer sleeve surrounds the inner sleeve. The duct member is interposed between the inner and outer sleeves. The duct member defines a neutral conductor passage. The electrical connection and the primary conductors of the first and second cables extend through the cable passage and the at least one neutral conductor of the first cable extends through the neutral conductor passage of the duct member and is coupled to the at least one neutral conductor of the second cable.

According to some embodiments, the first and second cables are each jacketed concentric neutral cables. Each of the first and second cables includes an insulation layer surrounding the primary conductor thereof and electrically insulating the primary conductor from the at least one neutral conductor thereof. The primary conductor, the insulation layer and the at least one neutral conductor are relatively concentrically configured.

In some embodiments, the at least one neutral conductor of the first cable includes a plurality of neutral conductors extending through the neutral conductor passage and being coupled to at least one neutral conductor of the second cable.

According to some embodiments, the cover assembly is a cold shrinkable cover assembly.

According to method embodiments of the present invention, a method for forming a connection assembly includes: forming an electrical connection between first and second electrical cables, the first and second cables each including a primary conductor and at least one neutral conductor; providing an integral, unitary cover assembly including an inner elastomeric sleeve defining a cable passage, an outer elastomeric sleeve surrounding the inner sleeve, and a duct member interposed between the inner and outer sleeves, the duct member defining a neutral conductor passage; inserting the at least one neutral conductor of the first cable through the neutral conductor passage of the duct; mounting the cover assembly on the cables such that the electrical connection and the primary conductors of the first and second cables extend through the cable passage; and coupling the at least one neutral conductor of the first cable with the at least one neutral conductor of the second cable.

According to some embodiments, the cover assembly is a cold shrinkable cover assembly.

According to further method embodiments of the present invention, a method for forming an integral, unitary cover assembly for covering an electrical connection between first and second electrical cables each having a primary conductor and a neutral conductor includes: forming an inner elastomeric sleeve defining a cable passage to receive the electrical connection and the primary conductors of the first and second cables; forming an outer elastomeric sleeve surrounding the inner sleeve; and interposing a duct member between the inner and outer sleeves, the duct member defining a neutral conductor passage configured to receive at least one of the neutral conductors therethrough.

In some embodiments, the method includes integrally molding the duct member between the inner elastomeric sleeve and the outer elastomeric sleeve.

The method may include mounting the inner and outer sleeves with the duct member interposed therebetween on a holdout device, wherein the holdout device is operative to temporarily maintain the inner sleeve and the outer sleeve in an expanded state.

According to some embodiments, the cover assembly is a cold shrinkable cover assembly.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 6-9 are side views illustrating procedures for installing the cover assembly of FIG. 1 on a pair of concentric neutral cables coupled by a connector.

DETAILED DESCRIPTION OF EMBODIMENTS OF THE INVENTION

Figure 1:
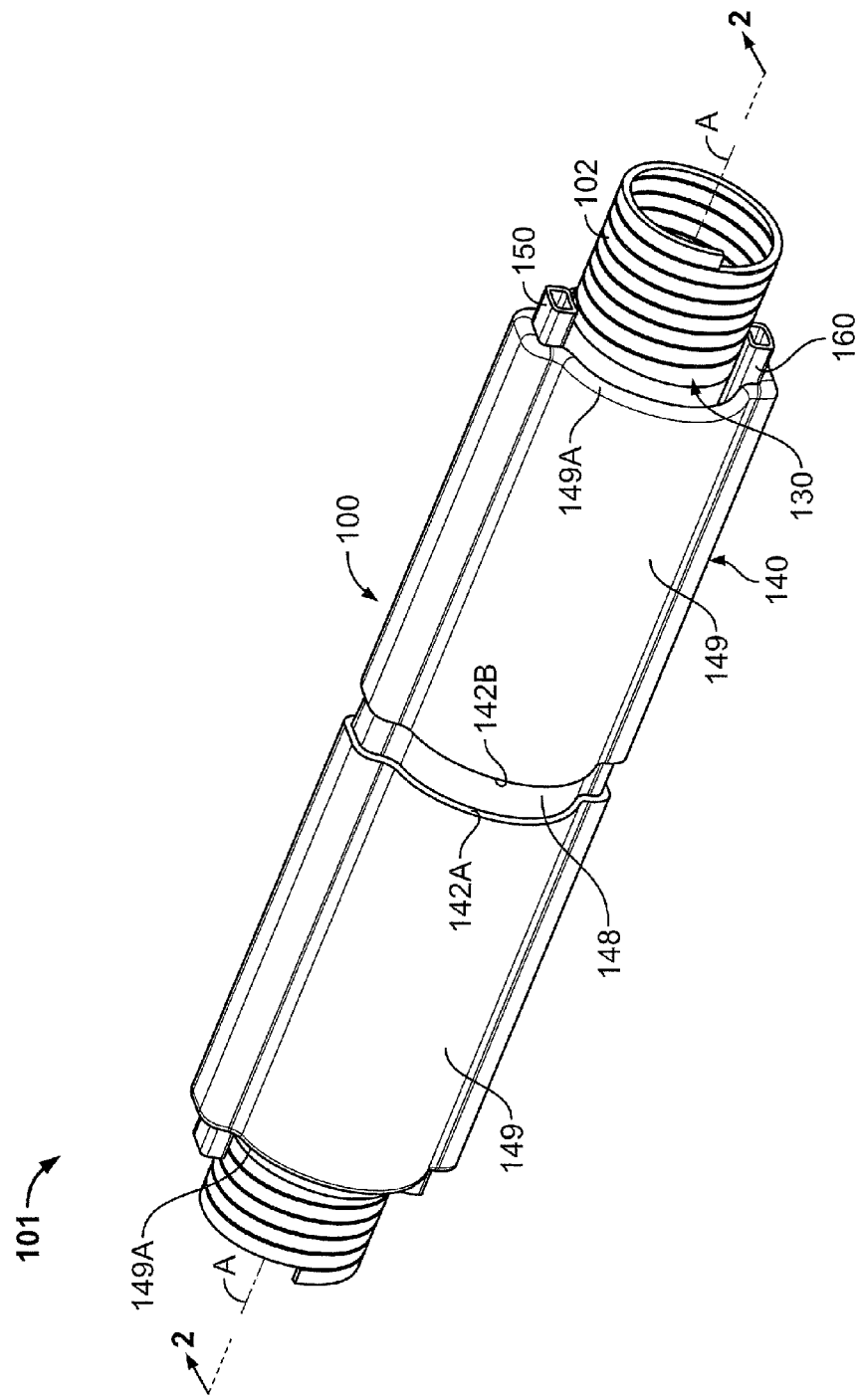
FIG. 1 is a perspective view of a pre-expanded unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
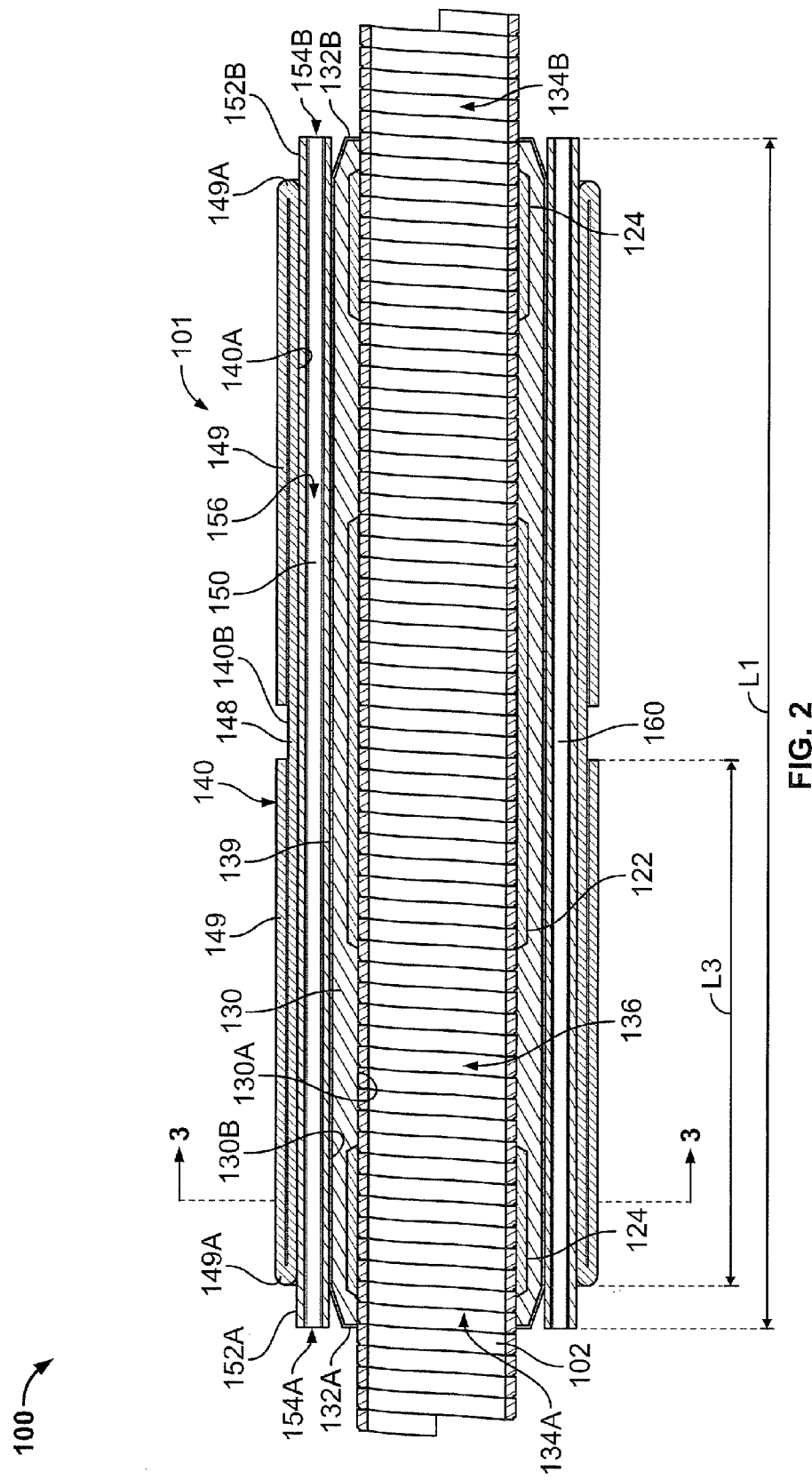
FIG. 2 is a cross-sectional view of the pre-expanded unit of FIG. 1 taken along the line 2-2 of FIG. 1.
Figure 3:
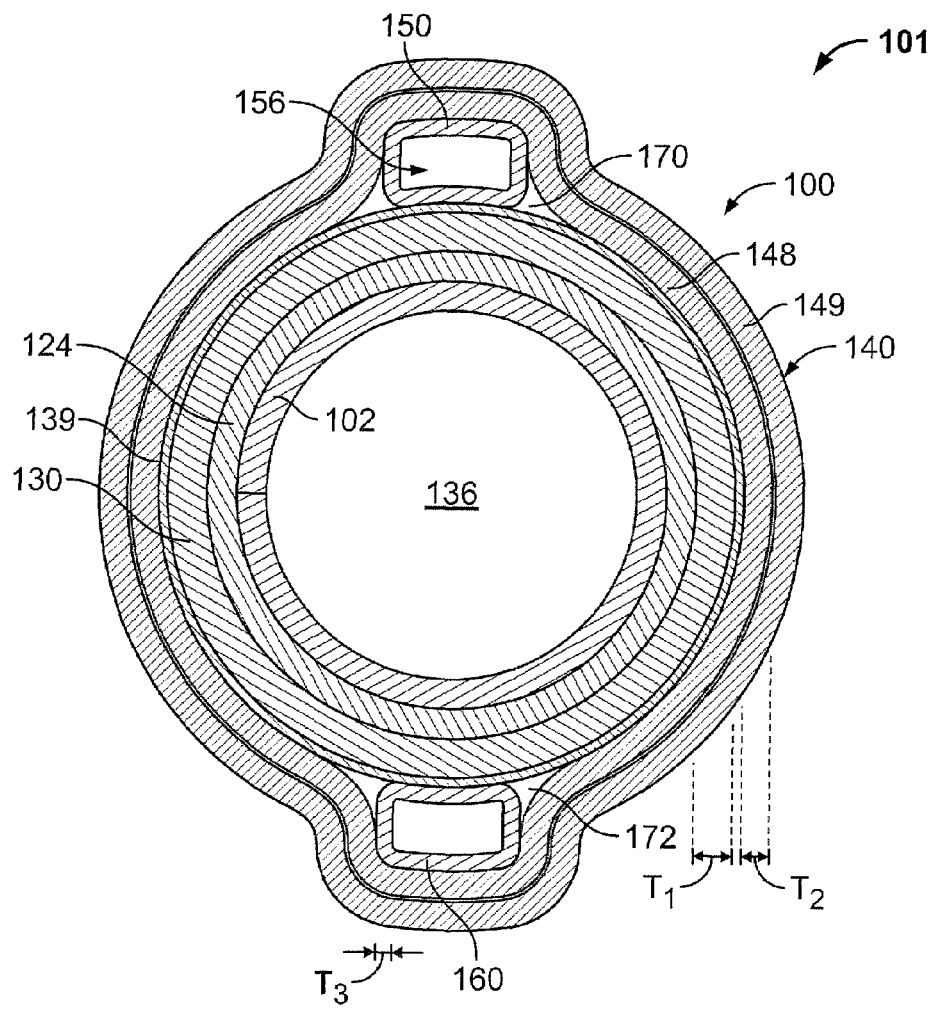
FIG. 3 is a cross-sectional view of the pre-expanded unit of FIG. 1 taken along the line 3-3 of FIG. 2.
Figure 4:
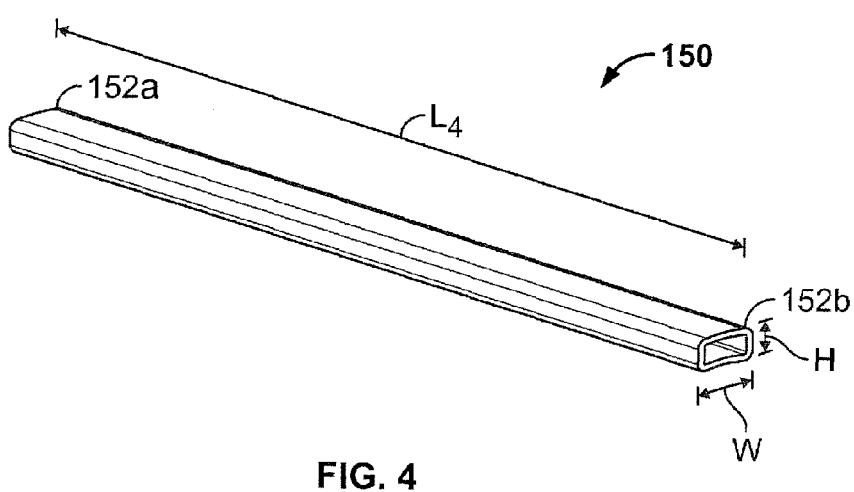
FIG. 4 is a perspective view of a duct member forming a part of the cover assembly of FIG. 1.
Figure 10:
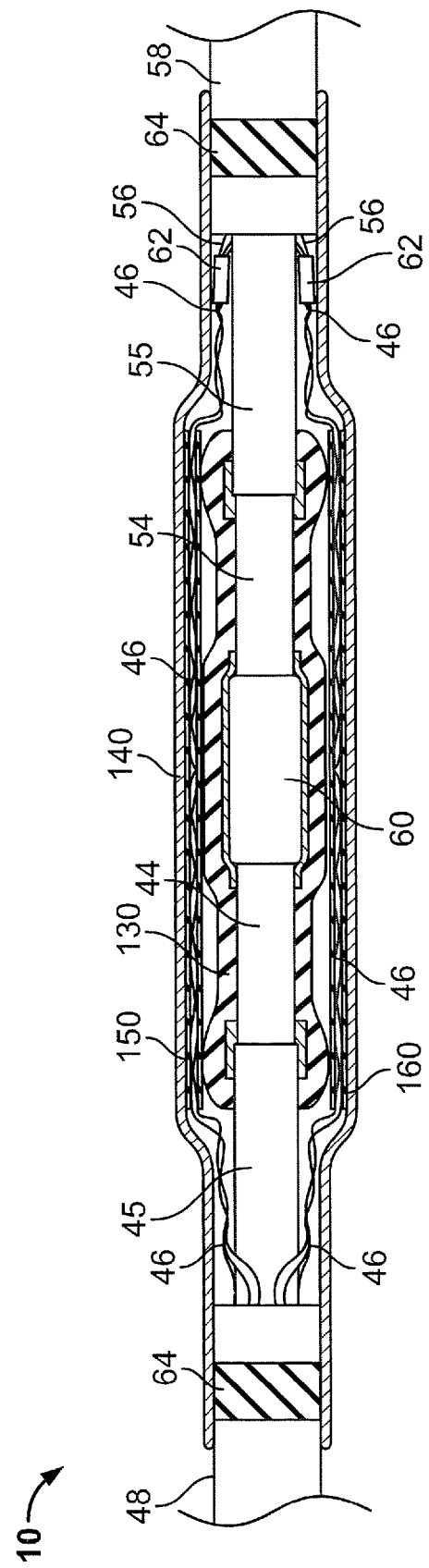
FIG. 10 is a cross-sectional view of the covered splice connection of FIG. 9.

With reference to FIGS. 1-4, a cover assembly 100 according to some embodiments of the present invention is shown therein. The cover assembly 100 includes a Faraday cage layer 122, stress cone layers 124, an inner sleeve (or insulation body) 130, a semiconductor layer 139, an outer sleeve (or re-jacket) 140, a first duct member 150, and a second duct member 160, as discussed in more detail below. The cover assembly 100 may be used to cover and electrically insulate electrical substrates such as cables and connectors. The cover assembly 100 may be provided as a pre-expanded unit 101 including a holdout device 102, as shown in FIGS. 1-3, wherein the cover assembly 100 is in an expanded state or position. The cover assembly 100 may be deployed and mounted on the intended substrate in a retracted state or position as shown in FIGS. 9 and 10 and discussed in more detail below. According to some embodiments, the cover assembly 100 is a cold shrink cover, meaning that it can be shrunk or retracted about the substrate without requiring the use of applied heat.

The cover assembly 100 may be used to cover and seal a connection or splice between two or more cables 40, 50 including a connector 60 to form a connection assembly 10 as shown in FIGS. 9 and 10. According to some embodiments, the cables 40, 50 are concentric neutral cables.

Referring to FIGS. 1-3, the cover assembly 100 has a lengthwise axis A-A. The Faraday cage layer 122, the stress cone layers 124, the inner sleeve 130, the semiconductor layer 139, the outer sleeve 140, the first duct member 150, and the second duct member 160 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 120 of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The outer sleeve 140 has opposed inner and outer surfaces 140A and 140B, and opposed ends 142A, 142B. The inner sleeve 140 is tubular and defines an axially extending conductor through passage that communicates with opposed end openings 144A, 144B. When mounted on the holdout 102 as shown in FIGS. 1-3, outer sections 149 of the outer sleeve 140 are folded back on an intermediate section 148 of the outer sleeve 140 at annular folds 149A.

The duct members 150, 160 may be constructed in the same manner and therefore only the duct member 150 will be described in detail, it being appreciated that this description likewise applies to the duct member 160. The duct member 150 has opposed ends 152A, 152B disposed adjacent the opposed ends 132A, 132B of the inner sleeve 130. The duct member 150 is tubular and defines a neutral conductor passage 156 (FIG. 2) extending axially therethrough and communicating with opposed end openings 154A, 154B. The cross-sectional shapes of the duct member 150 and the passage 156 are generally rectangular; however, other shapes (e.g., circular, trapezoidal) may be employed. The inner wall of the duct member 150 may be somewhat curvilinear or rounded in cross-section as shown to conform to the circular outer diameter of the inner sleeve 130.

The duct member 150 is disposed in a void or passage 170 (FIG. 3) defined between the inner sleeve 130 and the outer sleeve 140. Similarly, the duct member 160 is disposed in a void or passage 172 (FIG. 3) defined between the inner sleeve 130 and the outer sleeve 140. Thus, the duct members 150, 160 are sandwiched between the sleeves 130, 140 and thereby electrically insulated from both the conductor passage 136 and the environment.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness T1 (FIG. 3) of the inner sleeve 130 is in the range from about 0.07 to 1 inch. According to some embodiments, the length L1 (FIG. 2) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness T2 (FIG. 3) of the outer sleeve 140 is in the range of from about 0.11 to 0.25 inch. According to some embodiments, the length L2 (FIG. 9) of the outer sleeve 140 is in the range of from about 15 to 35 inches. According to some embodiments, the length L3 (FIG. 2) of each outer section 149 of the outer sleeve 140 is in the range of from about 10 to 25 percent greater than the length L2.

Each duct member 150, 160 can be formed of any suitable material. According to some embodiments, the duct members 150, 160 are formed of an electrically insulative material. According to some embodiments, the duct members 150, 160 are formed of a non-elastically expandable material. According to some embodiments, the members 150, 160 are formed of a polymeric material. According to some embodiments, the duct members 150, 160 are formed of plastic. Other suitable materials may include a metal such as copper or aluminum. According to some embodiments, the duct members 150, 160 are rigid or semi-rigid.

According to some embodiments, the thickness T3 (FIG. 3) of each duct member 150, 160 is in the range of from about 0.02 to 0.1 inch. According to some embodiments, each duct member 150, 160 has a width W (FIG. 4) in the range of from about 0.25 to 1 inch. According to some embodiments, each duct member 150, 160 has a height of H (FIG. 4) in the range of from about 0.25 to 0.5 inch. According to some embodiments, each duct member 150, 160 has a length L4 (FIG. 4) in the range of from about 8 to 10 inches greater than the length L1 of the inner sleeve 130.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The cover assembly 100 may be formed by any suitable method and apparatus. According to some embodiments, the inner sleeve 130 is molded and the outer sleeve 140 is thereafter insert overmolded about the inner sleeve 130 with the duct member 150, 160 interposed therebetween.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded. According to some embodiments, the duct members 150, 160 are each unitarily molded.

Alternatively, one or more of the inner sleeve 130, the outer sleeve 140 and the duct members 150, 160 may be extruded. According to some embodiments, one or more of these components is unitarily extruded.

Figure 5:
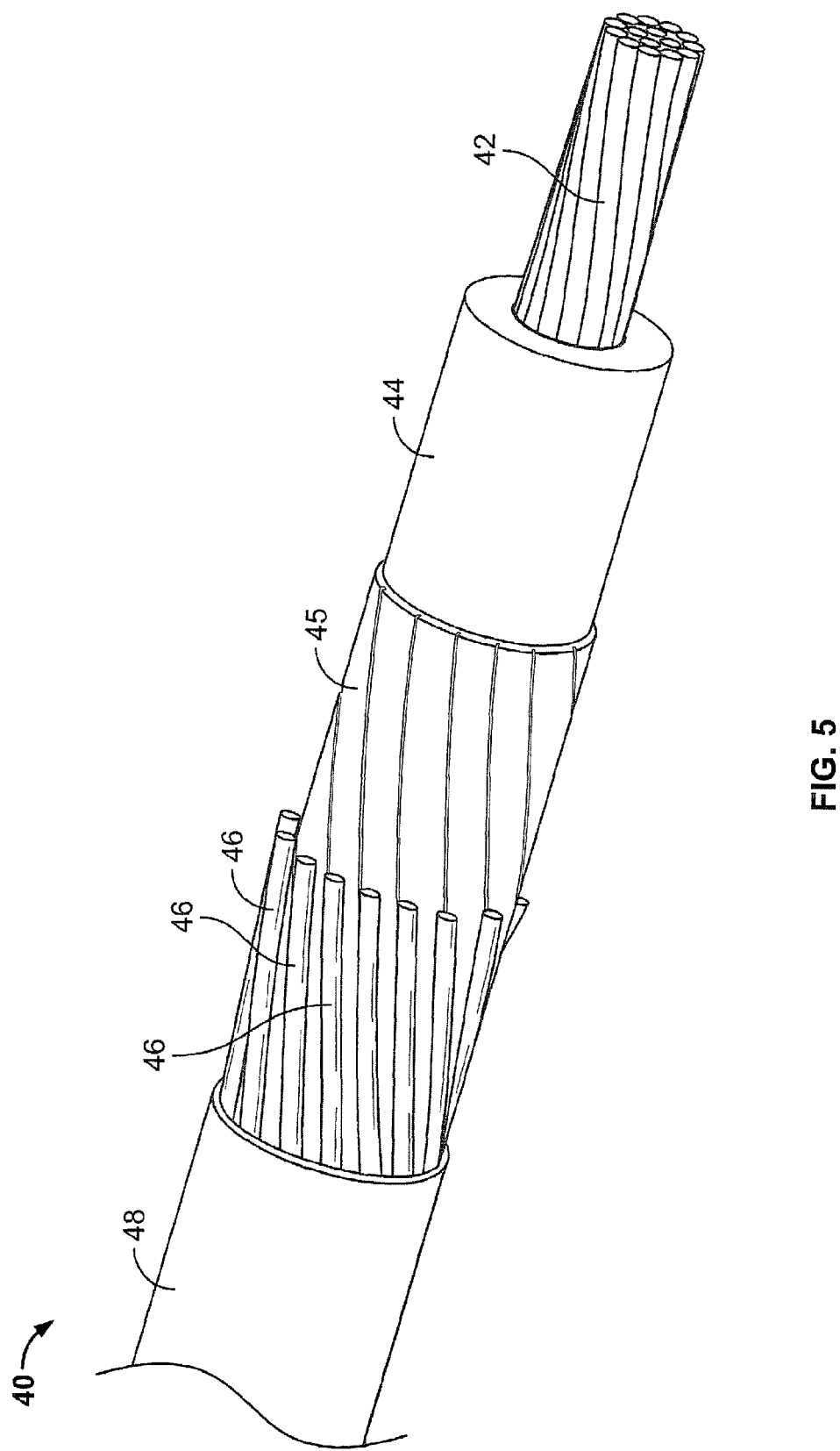
FIG. 5 is a perspective view of an exemplary concentric neutral cable.

Referring now to FIGS. 5-10, the unit 101 may be used in the following manner to apply the cover 100 over a splice connection 15 (FIG. 6) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 5, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 5 such that a segment of each layer extends beyond the next overlying layer, except that the neutral conductors 46 of the cable 40 extend at least a prescribed distance beyond the end of the primary conductor 42. This excess length of the conductors 46 can be folded back away from the terminal end of the primary conductor 42 as shown in FIG. 6.

Figure 6:
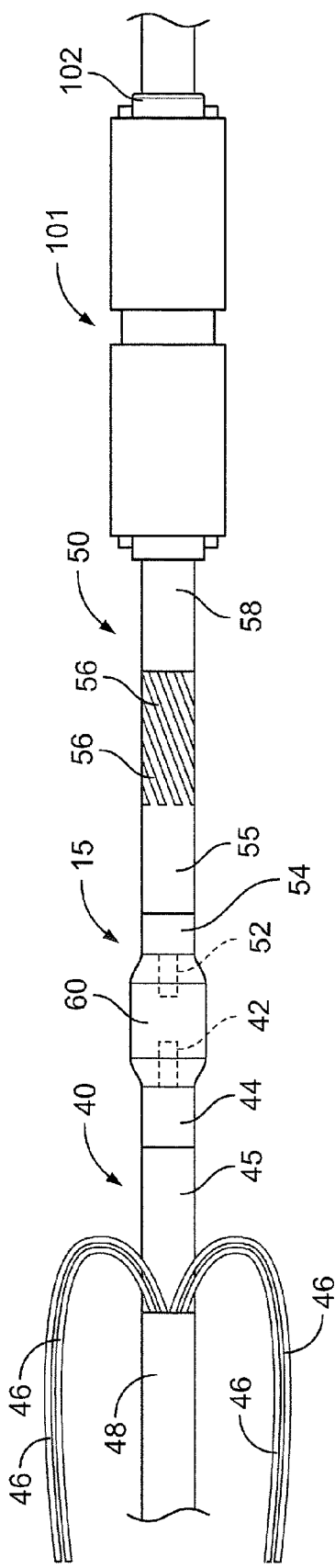

The pre-expanded unit 101 is slid over the cable 50 as shown in FIG. 6. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 6. The connector 60 may be any suitable type of connector such as a metal crimp connector.

Figure 7:
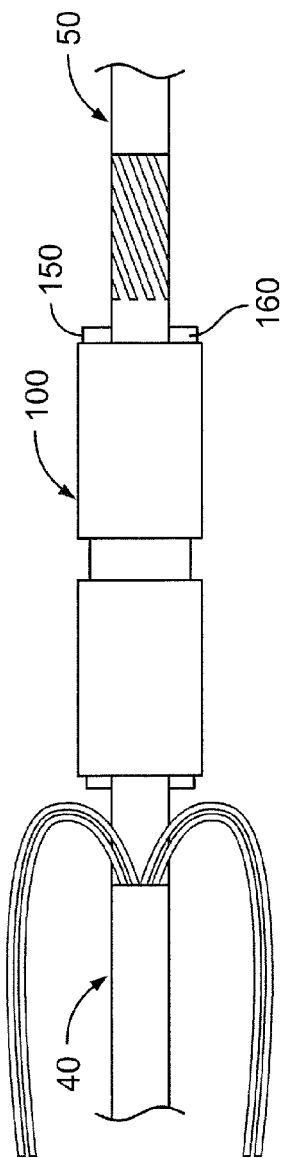

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 7. According to some embodiments, the inner sleeve 130 overlaps and engages the semiconductor layers 44, 54 of the cables 40, 50.

The excess length of the neutral conductors 46 is routed or threaded through the passages 156, 166 of the duct members 150, 160. The neutral conductors 46 are then electrically and mechanically coupled to the neutral conductors 56 by any suitable neutral connectors 70 as shown in FIG. 8. Each neutral connector 70 may be any suitable connector such as a metal crimp connector. As shown in FIG. 8, the neutral conductors 56 of the two cables 40, 50 may be coupled to one another on only one side of the connector 60. Alternatively, the neutral conductors 56 may be coupled to one another on both sides of the connector 60.

Strips of sealant 64 may be applied to the outer surfaces of the cable jackets 48, 58. The operator then rolls each up the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. The cover assembly 100 is thereby fully installed to form the connection assembly 10 as shown in FIGS. 9 and 10.

Optionally, the neutral conductors 46 can be routed through the duct members 150, 160 after the holdout 102 has been removed and the cover assembly 100 has been initially secured about the splice connection 15. Also, while the neutral conductors 46 are shown routed through both of the duct members 150, 160, only one of the duct members 150, 160 may be used. According to further embodiments, the cover assembly 100 may include more or less than two duct members and the duct members may be disposed at different positions about the circumference of the cover assembly 100.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

Cover assemblies and methods of the present invention and as described herein can provide a number of advantages. The cover assembly 100 provides an "all-in-one" integral unit that can be installed in similar fashion to known cold shrink splice cover insulating tubes and that also accommodates the neutral conductors of concentric neutral cables. The cover assembly 100 including the inner sleeve 130, the outer sleeve 140 and the duct members 150, 160 can be preassembled at a factory. Therefore, it is not necessary to provide and install a separate and supplemental re-jacketing cover to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By permitting the use of the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

The cover assemblies and methods of the present invention also permit the operator to form the connection with only a single connection (for example, crimp connection) between the neutral conductors of one cable and the neutral conductors of the other cable. Moreover, this configuration permits the operator to form the connection with a crimp on only one side of the splice.

More generally, the cover assemblies and methods of the present invention can provide improvements in ease of installation. For example, in embodiments wherein the duct members are rigid or semi-rigid, the neutral conductors can be conveniently inserted through the passages of the duct members.

While in the embodiments shown in the drawings the neutral conductors are wires, according to further embodiments the neutral conductors may take other shapes or configurations such as one or more flat tapes.

While the duct members 150, 160 as illustrated extend the full length of the inner sleeve 130, according to other embodiments, the duct members extend only partially (i.e., a distance less than the full length) across the inner sleeve 130.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Cover assemblies according to embodiments of the invention may be used for any suitable cables and connections. Such cable assemblies may be adapted for use, for example, with connections of medium voltage cables up to about 46 kV.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary cover assembly for covering an electrical connection between first and second electrical cables each having a primary conductor and a neutral conductor, the cover assembly comprising:
    an inner elastomeric sleeve defining a cable passage to receive the electrical connection and the primary conductors of the first and second cables;
    an outer elastomeric sleeve surrounding the inner sleeve; and
    a duct member interposed between the inner and outer sleeves, the duct member defining a neutral conductor passage configured to receive at least one of the neutral conductors therethrough.

2. The cover assembly of claim 1 wherein the duct member is rigid or semi-rigid.

3. The cover assembly of claim 1 wherein the duct member is tubular.

4. The cover assembly of claim 1 including a second duct member interposed between the inner and outer sleeves, the second duct member defining a second neutral conductor passage configured to receive at least one of the neutral conductors therethrough.

5. The cover assembly of claim 1 wherein the cover assembly extends along a lengthwise axis from a cover first end to a cover second end, and the inner sleeve, the outer sleeve and the duct member each extend lengthwise and have a respective first end proximate the cover first end and a respective second end proximate the cover second end.

6. The cover assembly of claim 5 wherein the outer sleeve includes an extension section that extends lengthwise beyond the first end of the duct member.

7. The cover assembly of claim 6 wherein the extension section of the outer sleeve extends lengthwise beyond the first end of the inner sleeve.

8. The cover assembly of claim 1 wherein the outer sleeve is formed of ethylene propylene diene monomer (EPDM) rubber.

9. The cover assembly of claim 1 wherein the inner sleeve is formed of silicone rubber.

10. The cover assembly of claim 1 including a Faraday cage sleeve mounted within the inner sleeve and formed of an electrically conductive elastomer.

11. The cover assembly of claim 1 including a stress cone sleeve mounted within the inner sleeve proximate an end thereof wherein the stress cone sleeve is formed of an electrically conductive elastomer.

12. The cover assembly of claim 1 including a semiconductor layer mounted on an outer side of the inner sleeve and formed of an electrically conductive elastomer.

13. The cover assembly of claim 1 further including a removable holdout device mounted within the inner sleeve, wherein the holdout device is operative to temporarily maintain the inner sleeve and the outer sleeve in an expanded state.

14. The cover assembly of claim 1 wherein the cover assembly is a cold shrinkable cover assembly.

15. A connection assembly comprising:
    first and second electrical cables each including a primary conductor and at least one neutral conductor;
    a connector coupling the primary conductors of the first and second cables to form an electrical connection;
    an integral, unitary cover assembly including:
        an inner elastomeric sleeve defining a cable passage;

an outer elastomeric sleeve surrounding the inner sleeve; and a duct member interposed between the inner and outer sleeves, the duct member defining a neutral conductor passage;

wherein the electrical connection and the primary conductors of the first and second cables extend through the cable passage and the at least one neutral conductor of the first cable extends through the neutral conductor passage of the duct member and is coupled to the at least one neutral conductor of the second cable.

16. The connection assembly of claim 15 wherein the first and second cables are each jacketed concentric neutral cables, each of the first and second cables including an insulation layer surrounding the primary conductor thereof and electrically insulating the primary conductor from the at least one neutral conductor thereof, the primary conductor, the insulation layer and the at least one neutral conductor being relatively concentrically configured.

17. The connection assembly of claim 16 wherein the at least one neutral conductor of the first cable includes a plurality of neutral conductors extending through the neutral conductor passage and being coupled to at least one neutral conductor of the second cable.

18. The connection assembly of claim 15 wherein the cover assembly is a cold shrinkable cover assembly.

19. A method for forming a connection assembly, the method comprising:

forming an electrical connection between first and second electrical cables, the first and second cables each including a primary conductor and at least one neutral conductor;

providing an integral, unitary cover assembly including:
an inner elastomeric sleeve defining a cable passage;
an outer elastomeric sleeve surrounding the inner sleeve; and a duct member interposed between the inner and outer sleeves, the duct member defining a neutral conductor passage;

inserting the at least one neutral conductor of the first cable through the neutral conductor passage of the duct;

mounting the cover assembly on the cables such that the electrical connection and the primary conductors of the first and second cables extend through the cable passage; and coupling the at least one neutral conductor of the first cable with the at least one neutral conductor of the second cable.

20. The method of claim 19 wherein the cover assembly is a cold shrinkable cover assembly.

21. A method for forming an integral, unitary cover assembly for covering an electrical connection between first and second electrical cables each having a primary conductor and a neutral conductor, the method comprising:

forming an inner elastomeric sleeve defining a cable passage to receive the electrical connection and the primary conductors of the first and second cables;

forming an outer elastomeric sleeve surrounding the inner sleeve; and interposing a duct member between the inner and outer sleeves, the duct member defining a neutral conductor passage configured to receive at least one of the neutral conductors therethrough.

22. The method of claim 21 including integrally molding the duct member between the inner elastomeric sleeve and the outer elastomeric sleeve.

23. The method of claim 21 including mounting the inner and outer sleeves with the duct member interposed therebetween on a holdout device, wherein the holdout device is operative to temporarily maintain the inner sleeve and the outer sleeve in an expanded state.

24. The method of claim 21 wherein the cover assembly is a cold shrinkable cover assembly.

* * * * *